United States Patent [19]

Mondt et al.

[11] 4,411,955

[45] Oct. 25, 1983

[54] REACTIVE HARDENABLE BINDER MIXTURE, PROCESS FOR PREPARING HARDENED PRODUCTS AND USE OF THE MIXTURE FOR THE PREPARATION OF COATINGS

[75] Inventors: Josef Mondt, Königstein/Taunus; Gerd Walz, Wiesbaden; Thaddäus Wirth, Heidenrod-Wisper, all of Fed. Rep. of Germany

[73] Assignee: Hoechst Aktiengesellschaft, Frankfurt am Main, Fed. Rep. of Germany

[21] Appl. No.: 316,806

[22] Filed: Nov. 2, 1981

[30] Foreign Application Priority Data

Nov. 5, 1980 [DE] Fed. Rep. of Germany ....... 3041653

[51] Int. Cl.$^3$ .................. B32B 27/28; C08L 33/02; C08L 63/00
[52] U.S. Cl. ................. 428/413; 525/438; 525/119; 528/297; 528/365
[58] Field of Search .......... 525/119, 438; 528/297, 528/365; 428/413

[56] References Cited

U.S. PATENT DOCUMENTS 4,131,715 12/1978 Frankel ........................ 525/119
4,240,938 12/1980 Kraft et al. .................... 525/119

Primary Examiner—Allan Lieberman
Attorney, Agent, or Firm—Hammond & Littell, Weissenberger and Muserlian

[57] ABSTRACT

A reactive hardenable binder composition based on
(A) at least one aliphatic, cycloaliphatic or aliphatic-cycloaliphatic polyepoxide wherein at least 2 epoxidized cycloaliphatic radicals are bound via an aliphatic bridge,
(B) at least one polycarboxylic acid unit of formula

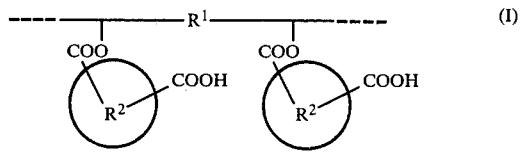

(I)

having an acid number between 30 and 400
wherein
$R^1$ is a radical of an at least oligomer product selected from the group consisting of polyesters and polymers having initially free OH-groups,
$R^2$ is a radical of a dicarboxylic carbocyclic acid having a COOH-group in ortho-position to its ester bond and
(C) a catalyst component of the formula

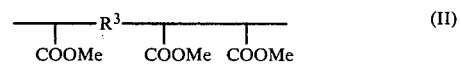

(II)

wherein
$R^3$ is a radical of a homo- or copolymer or combination of both of an unsaturated carboxylic acid with a statistically distributed number of COOH side groups or the radical of a polyester having initially free COOH-groups and
Me is one equivalent of an alkaline or an alkaline earth metal, thus being present in its salt form, a process for the preparation of hardened products from said composition and a coated article having a coating based on said composition.

10 Claims, 1 Drawing Figure

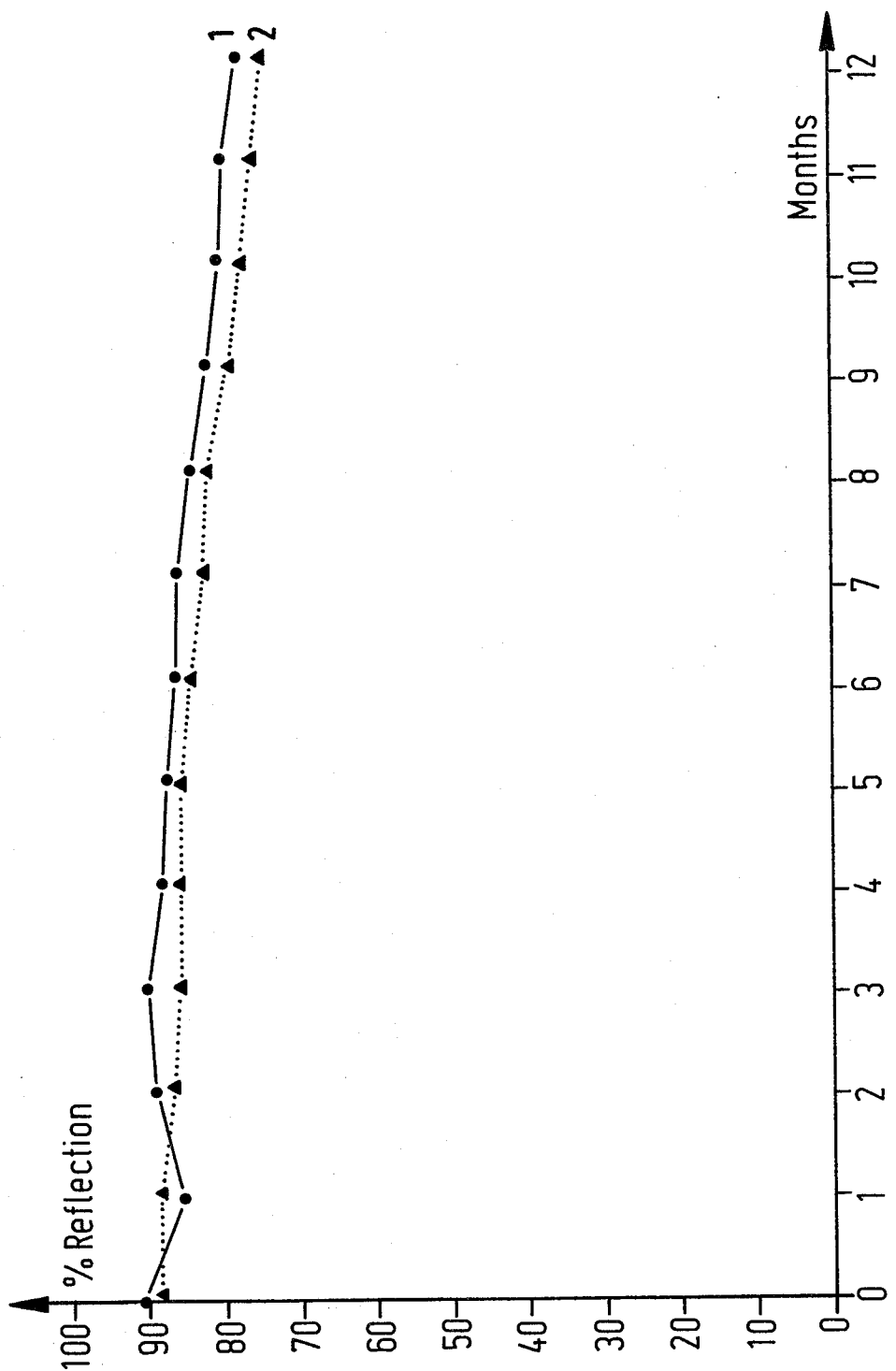

REACTIVE HARDENABLE BINDER MIXTURE, PROCESS FOR PREPARING HARDENED PRODUCTS AND USE OF THE MIXTURE FOR THE PREPARATION OF COATINGS

To reduce the processing and energy costs in paint and lacquer technology, there is a need for cheap and toxicologically harmless coating agents which can, in particular, be cured without the use of elevated temperatures. This applies particularly to coatings for wood, ceramics, plastics and especially for vehicle bodies which are to be repaired.

Hitherto, physically drying acrylate polymers combined with nitrocellulose or cellulose acetobutyrate and cross-linkable coating systems such as alkyd resins and polyurethanes, have been used for these applications. The physically dried systems consisting of acrylic polymers have the disadvantage of inadequate resistance to chemicals and insufficient strength. In the case of coatings prepared from alkyd resins, the problem of insufficient surface hardness arises after drying at ambient temperature. On the other hand, polyurethanes yield coatings which have the desired properties. However, they are expensive and the isocyanates which they contain are toxic.

Reactive hardenable polymer mixtures based on (A) aliphatic or cycloaliphatic epoxide compounds and (B) polycarboxylic acid units based on oligomeric and polymeric polymerisation and/or condensation products, containing OH groups, in the form of polyesters or polymers, on the one hand, and at least tetrabasic carboxylic acid compounds, on the other hand, are also known.

These mixtures may optionally also contain catalysts of various chemical structures, e.g. diazabicyclo compounds, imidazole derivatives, trialkylamines or the like; examples include hydroxides, carbonates and organic acid salts of alkali metals, such as lithium hydroxide, potassium carbonate and lithium benzoate. Even at ambient temperature, coating mixtures of this kind are capable of forming polymeric networks, e.g. in the form of films, having satisfactory properties. These mixtures therefore constitute a major advance in the desired direction.

However, in these known mixtures, either the catalysts mentioned above have only a poor catalytic activity at ambient temperature or difficulties arise with regard to compatibility and incorporation or with respect to the shelf life of the mixtures.

It was therefore desirable to improve the properties of the products obtained from these mixtures still further.

It has also already been proposed to add an active chromium (III) tricarboxylate as catalyst to mixtures of polyepoxides and monofunctional carboxylic acids. These mixtures do indeed show a high catalytic activity even at ambient temperature, but owing to their very dark intrinsic colour they are not suitable for use as coatings, particularly clear varnishes. Moreover, these catalysts are deactivated relatively rapidly at high humidity levels.

The invention provides a reaction hardenable binder mixture based on (A) at least one aliphatic and/or cycloaliphatic epoxide compound, (B) at least one polycarboxylic acid unit based on an oligomeric and/or polymeric polymerisation and/or condensation product having initially free OH groups, said product being selected from polyesters and polymers, this product being bound to a carbocyclic polycarboxylic acid via an ester group in such a way that there is still a free COOH group on the acid radical, in the o-position relative to this ester bond, and (C) a catalyst component in the form of at least one alkali and/or alkaline earth metal salt, characterised in that component (A) is present in the form of aliphatic and/or cycloaliphatic polyepoxide wherein at least two epoxidised cycloaliphatic radicals are connected to one another via an aliphatic bridge, which may optionally contain at least one ester group and/or one ether oxygen, (B) is a compound of formula I

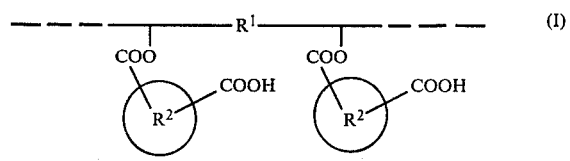

with an acid number of from 30 to 400, preferably 40 to 300, wherein $R^1$ is a group of a polymerisation and/or condensation product containing OH groups, which product is selected from the group consisting of polyesters and polymers, and $R^2$ is a group of a dibasic carbocyclic carboxylic acid having a COOH group in the o-position to the ester bond, and (C) represents a compound of formula II

wherein $R^3$ represents a group of a homo- and/or copolymer of an unsaturated carboxylic acid with a statistically distributed number of COOH side groups or the group of a polyester having initially free COOH groups and Me represents an equivalent of an alkali or alkaline earth metal which is present as a cation.

The mixtures according to the invention may be used to prepare products which have surprisingly favourable physical and chemical properties.

Examples of polyepoxide compounds (A) with two or more epoxide groups per molecule are those which appropriately have an epoxy equivalent weight of 80 to 500, preferably 120 to 300. Examples of aliphatic polyepoxide compounds include polyepoxide alkanes with a carbon number of from 4 to 20, preferably 4 to 12, epoxidised fatty acid esters, such as epoxidised linseed oil, epoxidised soya oil, epoxidised polybutadiene and isoprene oils. Examples of cycloaliphatic epoxide compounds include epoxidised cyclohexane and/or cyclopentene derivatives of formulae III to VI.

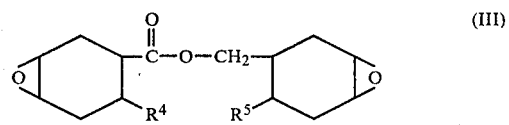

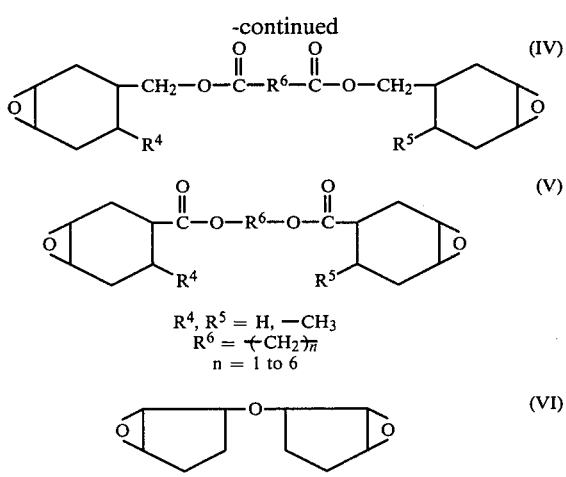

$R^4, R^5 = H, -CH_3$
$R^6 = \!-\!(CH_2)_{\overline{n}}\!-$
$n = 1$ to $6$

If desired, monoepoxides may also be used as reactive diluents. Examples of monoepoxides include olefin oxides, such as octylene oxide, butyl glycidyl ether, allyl glycidyl ether, phenyl glycidyl ether, p-butylphenol glycidyl ether, styrene oxide, glycidyl methacrylate, cyclohexenevinylmonoxide, dipentenemonoxide, α-pinene oxide and glycidyl ethers of tert. monocarboxylic acids.

Of the epoxide compounds mentioned, cycloaliphatic compounds in particular react very readily with the polycarboxylic acid units (B) to form 3-dimensional polymer networks. In many cases, cross-linking is obtained with these epoxide compounds even at ambient temperature, e.g. at 20° C. However, a preferred embodiment of the invention comprises the combination of cycloaliphatic epoxide compounds, e.g. those of formulae III to IV with epoxidised fatty acid esters and/or polyepoxide alkanes. The weight ratio of cycloaliphatic to aliphatic epoxide compounds may be, for example, 1:10 to 10:1, preferably 5:1 to 1:5.

The term "polymerisation and/or condensation products containing OH groups" also covers oligomers. If component (B) is formed from a polyester, these oligomers may be prepared in known manner from known polycarboxylic acids, such as phthalic acid, isophthalic acid, terephthalic acid, halophthalic acid, adipic acid, sebacic acid, fumaric acid, maleic acid, endo-methylenetetrahydrophthalic acid and the hexachloro derivatives thereof, trimellitic acid, optionally together with monocarboxylic acids such as benzoic acid, butylbenzoic acid, lauric acid, isononanic acid, fatty acids of naturally occurring oils or from mixtures or anhydrides of the above mentioned acids, where they exist. Examples of alcohol components of these polyesters include polyhydric alcohols such as ethylene glycol, the propane diols, butane diols, pentanediols, such as neopentylglycol, hexane diols, diethylene glycol, cyclohexyldimethanol, trimethylpentane diol, trimethylolethane or -propane, glycerol, pentaerythritol, dipentaerythritol, optionally together with monohydric alcohols such as butanol, octanol, lauryl alcohol, linoleyl alcohol or the like, either individually or in admixture.

The polyesters of component (B) may also be formed by at least partial chemical breakdown of high molecular polyesters of an aromatic nature, such as polyesters of terephthalic acid with ethylene glycol or butanediol, polyesters of isophthalic acid with ethylene glycol or hexanediol, under the effect of mono and/or polyhydric alcohols, esters, dicarboxylic acids or the like. If the reaction is carried out with monohydric alcohols, these may be reacted in a deficiency.

Other compounds containing hydroxyl groups and forming the group $R^1$ include, for example, polymerisation resins in the form of polyvinyl alcohol. However, polymerisation products prepared in known manner by mono- or copolymerisation of hydroxyalkyl acrylates or methacrylates or maleates with olefinically unsaturated monomers, e.g. styrene, α-methyl-styrene, the various vinyltoluenes, alkyl esters of acrylic or methacrylic acid, acrylonitrile, N-methylolacrylamide or allyl compounds are particularly suitable.

An acrylic polymer of this kind can be prepared by conventional methods, e.g. by radical polymerisation, and the monomers may be polymerised in solution or in substance. Examples of solvents for the polymerisation include aromatic hydrocarbons such as toluene or xylene, esters such as ethyl acetate, butyl acetate or ethylglycol acetate, either alone or in admixture. If desired, polymerisation may be effected in the presence of initiators such as azo-bis compounds, e.g. azo-bisisobutyronitrile, azo-bis-cyclohexanonitrile, peroxides such as benzoyl peroxide, di-tert.butylperoxide and in the presence of chain transfer agents, such as mercaptans, dodecyl-mercaptan or thioglycolic acid.

Examples of acids forming the group $R^2$ of component (B) in formula I include phthalic acid, tetra- and hexahydrophthalic acid and the derivatives thereof, more particularly the corresponding endo-alkylene, especially endo-methylene compounds, e.g. endo-methylenetetrahydrophthalic acid and (possibly in a minor amount) the halogen substitution products of these acids.

Appropriately, the ratio of total epoxy equivalents of component (A) to the free COOH groups of component (B) is 1:5 to 5:1, preferably 0.5:1 to 2:1.

In the catalyst component (C) according to formula II, $R^3$ is conveniently a homo- and/or copolymer of unsaturated mono- and/or dicarboxylic acids with 3 to 5 carbon atoms, e.g. acrylic or methacrylic acid, maleic acid, fumaric acid, itaconic acid, the halogen substitution products thereof such as chloroacrylic acid, either individually or in admixture, possibly with other copolymerisable monomers, such as esters including hemiesters, amides, nitriles of these acids, vinyl aromatic compounds such as styrene, the various vinyl toluenes, α-methylstyrene or the like. These polymers may be prepared using the known methods of polymerisation technology, e.g. radical polymerisation in solution. The acid number of the homo- or copolymer $R^3$ may be, for example, 10 to 500, preferably 50 to 300. It is also possible, for example, to use maleic acid/styrene telomers or polymers wherein the dicarboxylic acids are present as hemiesters.

Sodium, potassium, calcium but especially lithium are examples of metal atoms, Me, for forming the salt in component (C), either individually or in admixture. If alkaline earth metals are used, such catalysts will be used in smaller amounts. Catalyst (C) may be prepared, for example, by reacting lithium hydroxide or lithium methylate with the COOH groups of the desired polymer. However, it is also possible for a monomeric unsaturated carboxylic acid, e.g. acrylic acid, to be converted first into the corresponding metal salt and then into the polymer by homo- or copolymerisation.

The metal content of catalyst (C) is generally 1 to 30, preferably 5 to 20% by weight. The proportion of component (C) is generally 0.5 to 50, preferably 1 to 20% by weight, relative to component B. It is particularly advantageous to use component (C) in an amount such that the proportion of metal, relative to component (B), is 0.02 to 0.2 equivalent-%.

In general, the metal-containing catalyst are added in the form of their solutions, e.g. 50% solution in ethyleneglycol monoethyl ether acetate, to the mixtures according to the invention, before processing. However, it is also possible to add the polymeric catalysts to the polycarboxylic acid component (B) before mixing with the epoxide component (A).

If desired, other conventional additives and adjuvants such as pigments, fillers, flow agents, wetting agents, stabilisers or the like, together with solvents, may be added to the mixture. Examples of solvents include toluene, xylene, butanol, ethyl acetate, butyl acetate, ethyleneglycol diacetate, ethyleneglycol monoethyl or -butyl ether or the acetates thereof, ethyleneglycol dimethyl ether, diethyleneglycol dimethyl ether, petrol containing aromatic compounds, cyclohexanone, methyl ethyl ketone, acetone, isophorone, ethyl or butyl esters of acetoxyglycolic acid, either individually or in admixture. In many cases, it also possible to mix these solvents with up to 50% of petrol paint solvents, which are low in or free from aromatic compounds.

Generally, the mixtures according to the invention may be cured at $-30°$ to 350, preferably 0 to 180, more particularly $0°-80°$ C.

The preparation of the coating compositions by mixing the three components is preferably effected immediately before use, e.g. before they are applied to a substrate. For example, it is possible to add the desired pigments, other additives and solvents to a mixture of the polycarboxylic acid component (B) and then combine this solution with the other two components (A) and (C). On the other hand, it is also possible to prepare a mixture which is stable on storage for a certain period, from components (B) and (C), provided that they are compatible with each other, and possibly to add other additives. The same also applies to a mixture of components (A) and (C) to which the third component is added at a later stage. However, generally, all three components will be mixed together at the same time.

The mixtures according to the inventions, which show excellent stability to UV radiation, may be used to prepare coating systems, e.g. lacquers or paints, which may or may not contain pigments or other fillers. The film applied to a substrate may be hardened completely simply by leaving it at ambient temperature or at slightly elevated temperature, e.g. between ambient temperature and 80° C. In certain cases, it is also possible to effect curing at even higher temperatures, e.g. 2 minutes at 300° C., but adequate hardening is generally obtained at the lower temperatures.

The coating agents according to the invention may be applied to all kinds of substrate, such as ceramics, wood, glass, concrete, plastics, and preferably metal, such as iron, zinc, titanium, copper, aluminium, steel, brass, bronze, magnesium or the like. The substrate may, if desired, be made more suitable for adhesion or more resistant to corrosion by suitable mechanical and/or chemical pre-treatment. However, the coating compositions according to the invention adheres extremely well to all kinds of metal substrate without any adhesion-promoting priming or intermediate layer. The good adhesion of the coatings corresponds to the values GT OA to GT 1A according to the test requirements of DIN 53151. Moreover, these coatings may readily be deformed, have good resistance to weathering and outstanding chemical resistance.

The coating agents according to the invention are suitable for the preparation of corrosion-proofing coatings and/or intermediate coatings for all kinds of purposes, particularly as resistant glossy and matt lacquer coatings. They are also suitable for coating and lining objects which come into contact with fuels and solvents, and also for coatings to protect against atmospheric conditions, e.g. for road markings, components for electrotechnical use or elements thereof, particularly for electric conductors and coating objects subjected to thermal stress.

In view of their favourable properties, the coating compositions according to the invention are also particularly suitable for one-coat painting. Depending on the choice of component (A), metal sheets coated with the coating compositions according to the invention can subsequently be shaped by deep drawing, bending, profiling, stamping or the like without any appreciable deterioration in the other favourable properties. The coating layer adhering thereto may remain unaffected but may also serve as an intermediate layer, i.e. as an undercoat for further coatings, which may in turn consist of the same or another conventional coating material.

The coatings obtained are films having excellent mechanical and chemical resistance and good resistance to weathering. Surprisingly, there is no need for a high proportion of pigments and fillers in order to produce matt lacquers or paints.

Surprisingly, it has been found that the coatings according to the invention have outstanding properties particularly with regard to their resistance to chemical and atmospheric agents and with respect to their hardness and gloss. Thus, it was found in particular that the mixtures according to the invention proved exceptionally good as metallic lacquers in the so-called "Florida test". Their good chemical resistance is apparent particularly in the presence of water, solvents, alkaline and acidic substances. The exceptional film properties with regard to hardness, elasticity and resistance to weathering of the coatings obtained with the mixtures according to the invention are preferably achieved with the combination of aliphatic and cycloaliphatic epoxide compounds.

The mixtures according to the invention may therefore be used primarily for metal-effect lacquers or paints with good resistance to weathering.

In the examples which follow, T represents parts by weight and % represents percent by weight. The solids content was determined according to DIN 53183, the acid number (AN) according to DIN 53402, the iodine colour number according to DIN 6162 and the hydroxyl number (OHN) according to DIN 53183. The solvent ethyleneglycol monoethyl ether acetate is hereinafter referred to as "ethylglycol acetate".

EXAMPLES

I. Preparation of the polycarboxylic acid component (B)

(a) In a reactor fitted with a stirrer, reflux condenser and thermometer, 2285 T of xylene, 2285 T of ethylglycolacetate and 1890 T of a mixture of glycidyl esters of $\alpha,\alpha$-dialkylalkane monocarboxylic acid ($C_{9-11}$) are heated to 130° C. and a mixture of 2985 T of styrene, 480 T of methylmethacrylate, 1385 T of hydroxyethyl methacrylate, 583 T of acrylic acid and 50 T of di-t-butylperoxide are added uniformly, in batches, over a period of five hours. From a second vessel, a solution of 75 T of laurylmercaptan in 400 T of xylene is added, parallel to the mixture of monomers. Then the resulting mixture is stirred at 140° C. for a further six hours. The polymer solution is then cooled to 130° C. and 2340 T of phthalic anhydride and 22 T of diazobicyclooctane in solid form are added. For esterification, the mixture is stirred for two hours at 130° C. and after dilution with 1700 T of ethylglycolacetate, it is stirred at 120° C. for a further two hours. Characteristics: solids content 60%; AN($H_2O$) 136; AN (alcohol) 130; iodine colour number 2 to 3.

(b) In an apparatus as in (a), 1575 T of xylene, 1575 T of ethylglycolacetate and 1200 T of the glycidyl ester as in (a) are heated to 130° C. Then a mixture of 260 T of styrene, 1500 T of methylmethacrylate, 1320 T of hydroxypropylmethacrylate, 370 T of acrylic acid and 35 T of di-t-butylperoxide is added in portions over a period of five hours. From a second vessel, 50 T of laurylmercaptan are added in portions, parallel to the mixture of monomers. Then the resulting mixture is stirred at 140° C. for a further six hours.

After cooling to 130° C., 2020 T of tetrahydrophthalic anhydride and 20 T of diazabicyclooctane in solid form are added to the polymer solution. This mixture is stirred for another two hours at 130° C. and, after being diluted with 1430 T of ethylglycolacetate, it is stirred at 120° C. for a further two hours. Characteristics: solids content 60%; AN(alcohol) 132; AN($H_2O$) 145; iodine colour number 2.

(c) At 140° C., 1016 T phthalic anhydride in the presence of 2 T of 2-phenylimidazoline are added to a 60% polyester solution in xylene/ethylglycolacetate (2:1), prepared from 525 T of trimethylolpropane, 1150 T of neopentylglycol and 1950 T of phthalic anhydride with an acid number of about 14. The mixture is stirred at 140° C. for three hours and then diluted with ethylglycolacetate to give a 60% solids content. Characteristics: AN($H_2O$) 105; iodine colour number 1.

II Preparation of the catalyst component (d) In an apparatus as in Example 1, 150 T of xylene and 150 T of ethylglycolacetate are heated to 140° C. Then 100 T of styrene, 260 T of methylmethacrylate, 72 T of acrylic acid, 30 T of butylacrylate, 12 T of di-tert-butylperoxide and 6 T of laurylmercaptan are added, with stirring. After they have all been added, the resulting mixture is stirred for six hours at 140° C. The mixture is cooled to 80° C. and then a 10% solution of 560 T of potassium hydroxide in methanol is added in portions over a period of one hour.

The reaction mixture is stirred for a further hour at 80° C. Then the methanol is eliminated under reduced pressure. The resin solution is diluted with 50 T of ethylglycolacetate to give a solids content of 60%. AN($H_2O$) 10; iodine colour number 2.

(e) In an apparatus as in Example 1, 150 T of xylene and 150 T of ethylglycolacetate are heated to 130° C. with stirring. Then a mixture of 260 T of styrene, 60 T of methylmethacrylate, 72 T of acrylic acid, 70 T of butylacrylate, 12 T of di-t-butylperoxide and 5 T of laurylmercaptan is added in batches over a period of five hours. The resulting mixture is then stirred for a further six hours at 140° C. The mixture is then cooled to 80° C. and 380 T of a 10% methanolic solution of lithium methylate in methanol is added in portions over one hour. The mixture is stirred for a further hour at 80° C. The methanol is eliminated using an evaporator under reduced pressure and the resin solution is diluted with 60 T of ethylglycolacetate. Characteristics: solids content 60%; AN($H_2O$) 40; iodine colour number 3.

(f) In an apparatus as in Example 1, 150 T of xylene and 150 T of ethylglycolacetate are heated to 140° C. Then 60 T of styrene, 300 T of methylmethacrylate, 72 T of acrylic acid, 30 T of butylacrylate, 12 T of di-t-butylperoxide and 6 T of laurylmercaptan are added, with stirring. The resulting mixture is then stirred at 140° C. for six hours. The mixture is cooled to 80° C. Then, over a period of one hour, a 10% solution of 420 T of lithium hydroxide monohydrate in methanol is added in portions. The reaction mixture is stirred for a further hour at 80° C. and then the methanol is removed under reduced pressure, using an evaporator. The resin solution is diluted with 50 T of ethylglycolacetate. Characteristics: solids content 60%; AN($H_2O$) 11; iodine colour number 1 to 2.

III Preparation of the polymer mixture

The mixtures according to the invention listed in Table 1 are prepared from components (A), (B) and (C). Types (a) to (f) correspond to those described above under I and II, whilst the formulae given for component A correspond to those on the sheet of the formulae.

TABLE 1

|  | Example | | |
|---|---|---|---|
|  | 1 | 2 | 3 |
| Polycarboxylic acid unit (B) | 166.6 T type (b) 60%; AN $H_2O$ = 145 | 321.7 T type (b) 60%; AN $H_2O$ = 145 | 103.7 T type (c) 60%; AN = 105 |
| Epoxy resin component (A) | 42.7 T of a mixture of 4.8 T of compound III + 1.9 T of epoxidised soya oil Total — EEW = 181 | 116.2 T of a mixture of 4.8 T of compound IV + o 4.9 T of compound III + 1.6 T of epoxidised linseed oil 0.5 T of epoxidised soya oil Total — EEW = 197 | 14.7 T of a mixture of 0.9 T of a compound VI 1.1 T of epoxidised polybutadiene oil Total — EEW = 154 |
| Catalyst component (C) | 25 T type (e) 60% | 41.1 T type (f) 60% | 8.5 T type (e) 60% |

+ $R^4 = R^5 = H$
o $R^6 = $ -(CH$_2$)$_4$-
EEW = epoxy equivalent weight

|  | Example | | |
|---|---|---|---|
|  | 4 | 5 | 6 |
| Polycarboxylic acid unit (B) | 211.3 T type (c) 60%; AN $H_2O$ = 105 | 155.7 T type (a) 60%; AN $H_2O$ = 136 | 108.7 T type A 60%; AN = 136 |

TABLE 1-continued

| Epoxy component (A) | 42.1 T of a mixture of 1.2 T of compound IV + o 2.8 T of compound III + 0.9 T of epoxidised soya oil 1.1 T of epoxidised linseed oil Total — EEW = 177 | 33.6 T of a mixture of 2.06 T of compound III + 1.15 T of epoxidised linseed oil 0.95 T of epoxidised soya oil Total — EEW = 167 | 28.7 T of a mixture of 1.3 T of compound III + 2.2 T of epoxidised linseed oil Total — EEW = 167 |
|---|---|---|---|
| Catalyst component (C) | 23.2 T type (e) 60% | 17 T type (e) 60% | 11 T type (e) 60% |

+ $R^4 = R^5 = H$
o $R^6 = [CH_2]_4$

| | Example | |
|---|---|---|
| | 7 | 8 |
| Polycarboxylic acid unit (A) | 176.3 T of polymer type (a) 60%; AN H₂O = 136 | 298.5 T of polymer type (a) 60%; AN H₂O = 136 |
| Epoxy resin component (B) | 23.2 T of a mixture of 9.5 T of compound III + + 0.9 T of epoxidised polybutadiene 1.1 T of epoxidised soya oil Total — EEW = 172 | 98.5 T of a mixture of 2.09 T of compound III + 1.98 T of compound IV + o 3.46 T of epoxidised linseed oil Total — EEW = 175 |
| Catalyst component (C) | 12.3 T type (f) 60% | 31.2 T polymer type (f) 60% |

++ $R^4 = R^5 = -CH_3$
+ $R^4 = R^5 = H$
o $R^6 = +CH_2+$

(IV) Technical tests on the lacquers

The mixtures according to the invention were pigmented with titanium dioxide in a ratio of total binder to titanium dioxide of 1:1 and then diluted with a solvent (xylene/ethylglycolacetate 1:1) to give an out-flow time of 60 to 80 seconds in a 4 mm DIN cup. The mixture was then applied to sheets of glass using a triangular spreader. The layer thickness of the film was 25 to 30 μm (dry layer thickness).

In order to determine the Erichsen cupping, the mixture was applied to polished steel sheets. Again, the film had a layer thickness of 25 to 30 μm (dry layer thickness).

In order to determine the touch-dry drying time, reflective beads with a diameter of 0.1 to 0.4 mm were applied to the film of lacquer over a width of 5 mm, by means of a pipette. Then the sheet of glass coated with the lacquer was placed at an angle and tapped. When all the beads fell off, the film was touch-dry.

The results of the technical lacquer tests are assembled in Table 2 for different curing conditions. In this Table, (a) represents hardening at ambient temperature and (b) represents hardening at 100° C. for thirty minutes. The pendulum hardness, resistance to xylene and resistance to scratching were determined after 1, 7 and 14 days.

In the evaluation of the resistance to scratching zero is the best value and five is the worst value.

Florida weathering

In addition, two testpieces were subjected to a twelve month Florida weathering test. Metal effect lacquers with a clear lacquer top coat over mixtures according to Examples 6 and 8 were tested. The primer consisted of a mixture of 10.5 T of oil-free polyester and 11.2 T of cellulose acetobutyrate with 5 T of aluminium pigment. The mixture was diluted with a solvent mixture of xylene, butylacetate and ethyleneglycolmonobutylether (2:7:1) to give an out-flow time of 15 seconds in the 4 mm DIN cup. First, the primer was applied in a wet layer thickness of about 100 μm and after three minutes the top coat was applied. The coating was hardened by leaving at ambient temperature for 14 days.

The results are shown in FIG. 1. The reflection of the lacquers is given as a percentage, as a function of the duration of weathering.

Graph 1 shows the results obtained with the testpieces according to Example 6 and graph 2 gives the results obtained with the testpieces according to Example 8.

| | | Example | | | | | | | | | | | | | | | |
|---|---|---|---|---|---|---|---|---|---|---|---|---|---|---|---|---|---|
| Touch-dry | | 1 | | 2 | | 3 | | 4 | | 5 | | 6 | | 7 | | 8 | |
| drying time (min) | Days | a 36 | b | a 40 | b | a 45 | b | a 39 | b | a 32 | b | a 25 | b | a 40 | b | a 35 | b |
| Pendulum hardness | 1 | 89 | 115 | 95 | 118 | 79 | 102 | 85 | 119 | 75 | 114 | 92 | 120 | 78 | 108 | 82 | 115 |
| | 7 | 169 | 182 | 175 | 181 | 153 | 166 | 160 | 169 | 150 | 179 | 172 | 180 | 165 | 169 | 169 | 179 |
| | 14 | 189 | 188 | 185 | 186 | 178 | 180 | 190 | 195 | 189 | 195 | 193 | 198 | 187 | 197 | 185 | 199 |
| Resistance to xylene after (min) | 1 | 1 | 11 | 2 | 10 | <1 | 9 | <1 | 13 | <1 | 10 | <1 | 15 | <1 | 12 | <1 | 11 |
| | 7 | 65 | 80 | 83 | 85 | 52 | 60 | 45 | 59 | 52 | 89 | 60 | 95 | 68 | 90 | 70 | 80 |
| | 14 | ← | ← | ← | ← | → | → | → | 120 | → | → | → | → | → | → | → | → |
| Resistance to scratching after (min) | 1 | 5 | 4 | 4 | 2 | 5 | 4 | 5 | 3 | 5 | 3 | 4 | 2-3 | 4 | 2 | 5 | 3 |
| | 7 | 2 | 0 | 0 | 0 | 3 | 0 | 2 | 0 | 3 | 0 | 2 | 0 | 3 | 0 | 2 | 0 |
| | 14 | 0 | 0 | 0 | 0 | 0 | 0 | 0 | 0 | 0 | 0 | 0 | 0 | 0 | 0 | 0 | 0 |
| Erichsen cupping after (min) | 14 | 8,0 | 8,3 | 7,8 | 7,2 | 9,7 | 9,6 | 8,9 | 8,1 | 9,8 | 9,1 | 9,2 | 9,0 | 8,3 | 8,4 | 9,8 | 9,2 |
| Gloss | 14 | 91 | 90 | 92 | 93 | 91 | 92 | 92 | 92 | 95 | 93 | 92 | 93 | 94 | 93 | 95 | 95 |

| | | Example | | | | | | | | | | | | | | |
|---|---|---|---|---|---|---|---|---|---|---|---|---|---|---|---|---|
| Touch-dry | | 1 | | 2 | | 3 | | 4 | | 5 | | 6 | | 7 | | 8 |
| drying time | | a | b | a | b | a | b | a | b | a | b | a | b | a | b | a | b |
| (min) | Days | 36 | | 40 | | 45 | | 39 | | 32 | | 25 | | 40 | | 35 | |
| according to Lange 60° angle | | | | | | | | | | | | | | | | | |

(V) Discussion of the results

As can be seen from Table 2, after 14 days all the testpieces are highly satisfactory especially with regard to their surface hardness, scratch resistance, gloss and chemical resistance, even when hardened at ambient temperature. These properties are thus comparable with those obtained under the curing conditions (b), i.e. by stoving for 30 minutes at 100° C.

The FIGURE shows that the mixtures according to the invention have excellent resistance to weathering, so that even after a year a reflection equal to at least 75% of the original value is still obtained.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A reactive hardenable binder composition based on
(A) at least one aliphatic, cycloaliphatic or aliphatic-cycloaliphatic polyepoxide with a total epoxy equivalent weight between 80 and 500, wherein at least 2 epoxidized cycloaliphatic radicals are bound via an aliphatic bridge,
(B) at least one polycarboxylic acid unit of formula

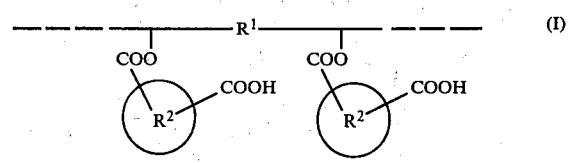 (I)

having an acid number between 30 and 400 wherein
$R^1$ is a radical of an at least oligomer product selected from the group consisting of polyesters and polymers having initially free OH-groups,
$R^2$ is a radical of a dicarboxylic carbocyclic acid having a COOH-group in ortho-position to its ester bond and
(C) a catalyst component of the formula

 (II)

wherein
$R^3$ is a radical of a homo- or copolymer or combination of both of an unsaturated carboxylic acid with a statistically distributed number of COOH side groups having an acid number between 10 and 500, or the radical of a polyester having initially free COOH groups,
Me is one equivalent of an alkali or an alkaline earth metal, thus being present in its salts form, said component (C) is present in such an amount that the metal content is between 0.02 and 0.2 equivalent-%, referred to component (B), the ratio of the total epoxy equivalents of component (A) to the free COOH-groups of component (B) is between 1:5 and 5:1.

2. A composition as claimed in claim 1 wherein in component (A) at least 2 epoxidized cycloaliphatic radicals are bound via an aliphatic bridge containing at least one group selected from the group consisting of ester groups or ether oxygen atoms.

3. A composition as claimed in claim 1 containing aliphatic and cycloaliphatic epoxy compounds in a weight ratio between 1:10 and 10:1.

4. A composition as claimed in claim 1 wherein in component (C) of formula II $R^3$ is a homo- or copolymer, based on an at least dicarboxylic acid having between 3 and 5 C-atoms, or a combination of both.

5. A composition as claimed in claim 1 wherein component (C) contains lithium as a salt forming metal.

6. A process for the preparation of hardened products based on a composition as claimed in claim 1 wherein the composition is hardened at a temperature between −30° and 350° C.

7. A process as claimed in claim 6 wherein the hardened products are in the form of a coating on a substrate.

8. A coating on a substrate wherein the coating is based on a composition as claimed in claim 1.

9. A coating on a substrate wherein the coating is an undercoat for further coatings or a top coating layer derived from the composition as claimed in claim 1.

10. A coating on a substrate as claimed in claim 9 wherein the undercoat is a metal effect coating layer.

* * * * *